Dec. 6, 1949     B. A. RICCIO     2,490,160
BRAKE COIL SPRING EJECTOR
Filed Dec. 31, 1946     2 Sheets-Sheet 1
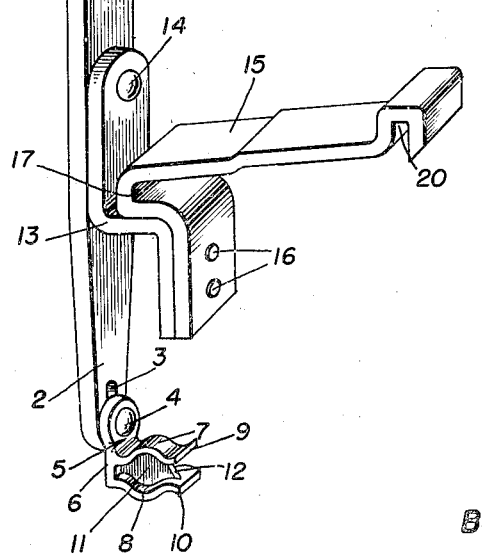
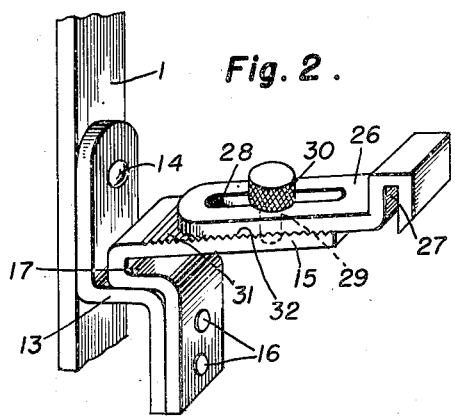
Inventor
Benjamin A. Riccio
By *Clarence A. O'Brien and Harvey B. Jackson*
Attorneys Dec. 6, 1949   B. A. RICCIO   2,490,160
BRAKE COIL SPRING EJECTOR
Filed Dec. 31, 1946   2 Sheets-Sheet 2
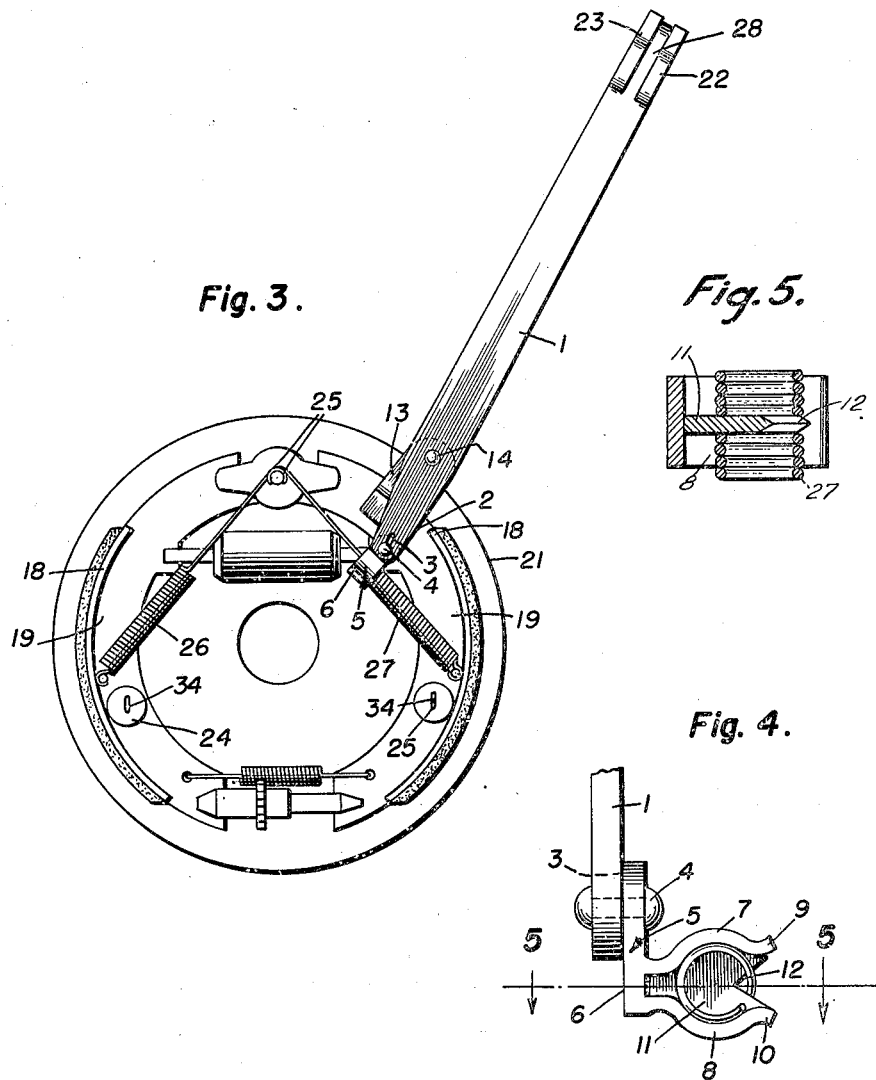
Inventor
Benjamin A. Riccio Patented Dec. 6, 1949

2,490,160

UNITED STATES PATENT OFFICE 2,490,160

BRAKE COIL SPRING EJECTOR

Benjamin A. Riccio, Norwalk, Conn.

Application December 31, 1946, Serial No. 719,497

5 Claims. (Cl. 29—227)

1

This invention relates to improvements in brake coil spring ejectors.

An object of the invention is to provide an improved implement for ejecting brake coil springs which are being removed or replaced.

Another object of the invention is to provide an improved brake coil spring ejector comprising an elongated actuating lever having an adjustable channel member pivotally supported thereon for positioning over the flange of a brake shoe, and a pivotally mounted coil spring engaging cup at the end of said lever, whereby the coil springs disposed between the upper central positioning stud and the cooperating brake shoes may be readily engaged for extracting and ejecting the same when it is necessary to remove or replace said coil springs.

Another object of the invention is to provide an improved brake coil spring ejecting implement for removing or replacing said springs, and means on said implement for removing or replacing the usual caps and springs used for engaging a pair of brake shoes intermediate their length for supporting the same in position in the brake assembly.

A further object of the invention is to provide an improved brake coil spring ejector which will be highly efficient in operation, and relatively inexpensive to manufacture and produce.

Other objects will appear as the description proceeds.

In the accompanying drawings which form a part of this application,

Figure 1 is a perspective view of the improved brake coil spring ejector implement;

Figure 2 is a detailed perspective view of a modified form of adjustable brake shoe flange engaging channel clip;

Figure 3 is a front elevation of a wheel and brake assembly showing the improved brake coil spring ejector implement in operative position thereon;

Figure 4 is an enlarged detailed view of the pivotally mounted coil spring engaging cup showing a spring disposed therein, and Figure 5 is a sectional view taken on the line 5—5 of Figure 4.

Like characters of reference are used throughout the following specification and the accompanying drawings to designate corresponding parts.

In carrying out the invention, there is provided an improved brake coil spring ejector implement comprising an elongated actuating lever I being tapered as at 2 adjacent one end, and

2 slotted as at 3 to receive the rivet 4 upon which the coil spring engaging cup 5 will be adjustably and pivotally supported.

The cup 5 is formed with a flat side 6 which is swingable as to the adjacent side of the lever I, and is formed with the laterally extending spaced arcuate coil spring encircling fingers 7 and 8 which are outwardly flared at 9 and 10 on their outer ends.

A transversely extending insert plate 11 is formed integrally with the cup 5, and is formed with a V-shaped sharpened forward edge 12 for slidable engagement between adjacent convolutions of a coil spring when the same is disposed between the spring encircling fingers 7 and 8, said mechanism being self-aligning and entirely automatic in operation.

In Figure 1 of the drawings, there is illustrated an offset bracket arm 13 being pivotally supported upon the actuating lever I by the rivet 14 which extends through the said lever and bracket arm.

An L-shaped positioning bracket arm 15 will be riveted at 16 to the offset bracket arm 13, and will be formed with a U-shaped positioning channel 17 adapted to fit snugly over the edge flanges 18 of the brake shoe 19. The outer end of the bracket arm 15 will be formed with a U-shaped positioning channel 20 formed at right angles to the said channel 17 for disposing or positioning over the edge of the brake shield 21 when the implement is to be thus anchored.

A pair of forked fingers 22 and 23 are integrally formed on the opposite end of the lever I, and an arcuate seat 24 is formed in the finger 28 for engaging the neck of the post when the eyes 25 of the coil springs 26 and 27 are to be pried therefrom, or replaced thereon.

A central angularly disposed finger 28 is formed integrally with the lever I between said fingers 22 and 23 for contacting the edges of the spring caps 24 and 25.

In Figure 2 of the drawings, there is illustrated a slightly modified form of bracket arm and channel for positioning over the brake shield 21, comprising a separate arm 26 having the channel clamping portion or clip 27 on one end and the arm 26 is slotted at 28 to receive the threaded locking screw 29 which extends therethrough and into the bracket arm 15. A knurled head 30 will be provided for the screw 29, and cooperating serrated inter-engaging surfaces 31 and 32 will be respectively formed on the bracket arms 15 and 26, whereby the bracket arms may be adjusted to fit various sizes of brake shoes and shields.

The inside or bottom ends of the fingers 22 and 23 will be formed with serrated surfaces 33 for preventing slippage while turning the caps 24 and 25 overlying the springs for securing the central portions of the brake shoes while removing said caps from their holding pins 34.

In operation, the implement will be instantly positionable by engaging the U-shaped channel 17 over the edge flange 18 of the brake shoe 19, and the coil spring engaging cup 5 will engage one of the coil spring 26 or 27 with the edge 12 of the insert plate 11 sliding into position between adjacent convolutions of the spring which is self-equalized as the actuating lever is actuated.

As the actuating arm 1 is moved on the pivot rivet 14, the spring will be moved so that the eyes 25 of the springs may be readily ejected from the post or disposed thereover as the case may be when replacing or renewing a spring.

Due to the construction of the positioning channel, the implement may be immediately attached and will be retained in position as firmly as though it were bolted to the brake assembly.

From the foregoing description, it will be apparent that there has been devised and provided a highly efficient form of brake coil spring ejector implement which will be highly efficient in operation and relatively inexpensive to manufacture and produce.

While the preferred embodiment of the instant invention has been illustrated and described, it will be understood that it is not intended to limit the scope of the invention thereto, as many minor changes in detail of construction may be resorted to without departure from the spirit of the invention.

Having thus described my invention, what I claim as new and desire to secure by Letters Patent of the United States is:

1. A spring applying and removing tool comprising a lever, a coil spring engaging and supporting cup slidably and pivotally carried by said lever, a retainer plate carried by said cup for positioning between adjacent convolutions of a coil spring to retain the same relative to said cup, and means for pivotally securing said lever to an edge of a brake shoe, said plate including a leading edge having a V-shaped notch therein, the edges of said notch being sharpened.

2. A spring applying and removing tool comprising a lever, a coil spring engaging and supporting cup slidably and pivotally carried by said lever, means carried by said cup for positioning between adjacent convolutions of a coil spring to retain the same relative to said cup, and means for pivotally securing said lever to an edge of a brake shoe, said last mentioned means including an angle member secured to said lever, a substantially U-shaped plate secured to said angle member, a channel member, and means adjustably securing said channel member to said U-shaped plate.

3. A spring applying and removing tool comprising a lever, a coil spring engaging and supporting cup slidably and pivotally carried by said lever, said cup including a pair of complemental arcuate fingers having outwardly flared end portions, a retainer plate fixed between and to both of said fingers and having a leading edge, a V-shaped notch provided in the leading edge of said retainer plate and having sharpened edges for engagement between a selected pair of convolutions of a coil spring, and means for pivotally securing said lever to an edge of a brake shoe.

4. A spring applying and removing tool comprising a lever, a coil spring engaging and supporting cup slidably and pivotally carried by said lever, said cup including a pair of complemental arcuate fingers having outwardly flared end portions, a retainer plate fixed between and to both of said fingers and having a leading edge, a V-shaped notch provided in the leading edge of said retainer plate and having sharpened edges for engagement between a selected pair of convolutions of a coil spring, an angle member mounted on said lever adjacent said supporting cup, a substantially U-shaped member having one leg portion turned outwardly to provide an anchoring portion, said anchoring portion being secured to one leg of said angle member, said one leg portion of said U-shaped member being supported by said angle member, and a channel member carried by one leg of said U-shaped member.

5. The combination of claim 4 wherein said channel member is slidably and pivotally secured to one leg of said U-shaped member.

BENJAMIN A. RICCIO.

REFERENCES CITED

The following references are of record in the file of this patent:

UNITED STATES PATENTS

| Number | Name | Date |
|---|---|---|
| 164,453 | Heysinger | June 15, 1875 |
| 687,214 | Entrekin | Nov. 26, 1901 |
| 1,467,914 | Balcom | Sept. 11, 1923 |
| 1,483,821 | Maples | Feb. 12, 1924 |
| 1,721,723 | Weston | July 23, 1929 |
| 1,889,167 | Anderson | Nov. 29, 1932 |
| 2,042,287 | Allievi et al. | May 26, 1936 |
| 2,441,696 | Feingold | May 18, 1948 |